(12) United States Patent
Oshima et al.

(10) Patent No.: US 6,630,235 B2
(45) Date of Patent: Oct. 7, 2003

(54) BULLET-PROOF GLASS SCREEN, AND BULLET-PROOF GLASS SCREEN DEVICE

(75) Inventors: Yasunobu Oshima, Tokyo (JP); Kenji Yoshida, Tokyo (JP)

(73) Assignee: Bunka Shutter Co., Ltd., Tokyo (JP)

( * ) Notice: Subject to any disclaimer, the term of this patent is extended or adjusted under 35 U.S.C. 154(b) by 57 days.

(21) Appl. No.: 09/959,095

(22) PCT Filed: Feb. 27, 2001

(86) PCT No.: PCT/JP01/01443

§ 371 (c)(1),
(2), (4) Date: Oct. 18, 2001

(87) PCT Pub. No.: WO01/64597

PCT Pub. Date: Sep. 7, 2001

(65) Prior Publication Data

US 2002/0160198 A1 Oct. 31, 2002

(30) Foreign Application Priority Data

Feb. 29, 2000 (JP) .......................................... 2000-53828

(51) Int. Cl.[7] .......................... B32B 17/10; C03C 27/12

(52) U.S. Cl. ...................... 428/339; 428/332; 428/412; 428/430; 428/441; 428/442

(58) Field of Search ................................. 428/332, 339, 428/412, 430, 441, 442

(56) References Cited

U.S. PATENT DOCUMENTS 5,496,643 A   3/1996   Von Alpen ................. 428/432

FOREIGN PATENT DOCUMENTS

| EP | 0 157 645 | 10/1985 |
| JP | 49-28610 | 3/1974 |
| JP | 51-24611 | 2/1976 |
| JP | 59-135152 | 8/1984 |
| JP | 1-156061 | 6/1989 |
| JP | 9-228422 | 9/1997 |
| JP | 10-193966 | 7/1998 |

*Primary Examiner*—D. S. Nakarani
(74) *Attorney, Agent, or Firm*—Kanesaka & Takeuchi

(57) ABSTRACT

A bulletproof glass screen and a bulletproof glass screen device which are relatively light and highly workable and provide a relatively high protectiveness and transparency. The rear face of a laminated glass 2, which is the opposite of the impact side of the glass, is covered by at least one sheet of plastic fracture-proof film 3.

16 Claims, 7 Drawing Sheets

BULLET-PROOF GLASS SCREEN, AND BULLET-PROOF GLASS SCREEN DEVICE

BACKGROUND OF THE INVENTION AND RELATED ART STATEMENT

The present invention relates to a bulletproof glass screen which is used for applications requiring protectiveness and transparency and a bulletproof glass screen device based on such a bulletproof glass screen.

A conventional bulletproof glass generally consists of a laminate of heat-treated, annealed glass plates whose thickness is from 10 to 12 mm. This kind of bulletproof glass as a laminate of, for example, four glass plates has an overall thickness of 40 to 50 mm. A laminate like this requires a high production cost and is poor in machinability and also weighty, which leads to poor workability. There are bulletproof screens which use polycarbonate resin plates instead of glass plates. However, this type of bulletproof screen requires a very high production cost and the surface may become yellowish for aged deterioration. In addition, since it takes the form of a plate, the yellowish surface or other part as a phenomenon of deterioration with time tends to be conspicuous.

An example of conventional bulletproof glass is the published Japanese translation of PCT international publication for patent applications No. 506056/1991. This bulletproof glass screen device is structured of a plurality of glass plates. Each surface of glass plates is covered by fracture-proof safety film. The glass plates are spaced at regular intervals. However, when this structure is used, the device must be wide and relatively heavy, resulting in a deterioration in workability.

SUMMARY OF THE INVENTION

The present invention has been made in view of the above circumstances and provides a bulletproof glass screen and a bulletproof glass screen device which are relatively lightweight and workable and provide a relatively high protectiveness and transparency.

In order to achieve the above-described object, a structure of the present invention is explained by reference to drawings illustrating embodiments of the invention. Each of these bulletproof glass screens 1 (1-1 to 1-7) is characterized in that at least one of the front and rear faces of a laminated glass 2 is covered by at least one sheet of plastic fracture-proof film 3. The fracture-proof film 3 can be attached only to at least one of the front and rear faces of the bulletproof glass screen 1. It is desirable to attach the fracture-proof film 3 to the rear side of the bulletproof glass screen 1, or the opposite of its impact surface. There are cases in which the condition of the surroundings including the inside or outside of a building or room is known and which direction bullets are most likely to come from is obvious. Usually it is thought that bullets are more likely to come from the outside of a building than from the inside or more likely to come from the outside of a room than from the inside. Therefore, in such cases, it is effective that the bulletproof glass screen's inside surface which is inside the building or room is covered by fracture-proof film. However, if the building is used as a shooting gallery or the like, it is more likely that bullets come from the inside of the building; thus in this case it is effective that the bulletproof glass screen's outside surface which is outside the building or room is covered by fracture-proof film.

The fracture-proof film 3 can be attached to both the front and rear faces of the bulletproof glass screen 1. If the fracture-proof film 3 is attached to both the front and rear faces of the screen, it is useful for a situation in which bullets may impact against both the front and rear faces of the bulletproof glass screen 1. When it is predictable that under some condition (during a certain period or time zone, etc.) bullets fly from a specific direction (for example, if shooting galleries are located on both sides of the screen and are alternately used for firing in the morning and afternoon for the reason of time-consuming preparation of the shooting galleries or other reason), covering of both the front and rear faces of the bulletproof glass screen 1 by the fracture-proof film 3 is effective. Also there is another situation in which, although bullets usually fly from a fixed direction, bullets can fly from the opposite direction in some special occasions. Covering of both the front and rear faces of the bulletproof glass screen 1 by the fracture-proof film 3 is also effective that not only the case where bulletproofing is primarily intended as a countermeasure against shooting from the outside of the building, but also the case where it is required to prevent bullets or splinters of a bullet from hitting a passer-by outside the building due to shooting or an explosion inside it.

Further, in the case of a bulletproof glass screen device as mentioned later, if the bulletproof glass screen 1 is assembled in the field where the device is installed, covering of both the front and rear faces of the bulletproof glass screen 1 by the fracture-proof film 3 is effective because there is a possibility of assembling the screen the wrong way.

The fracture-proof film 3 is generally made to adhere to all or virtually all the above-said surface of the bulletproof glass screen 1. All or virtually all the above-said surface refers to all or virtually all the surface of the screen except the rim for fitting the bulletproof glass screen 1, for example, into a window frame. If, for fitting into the window frame or in connection with any other thing pertaining to the building, some part of the surface of the bulletproof glass screen 1 is substantially exposed to the outside, it is a good idea to cover it by the fracture-proof film 3. It is also possible to attach the fracture-proof film 3 to 20 part of the above-said surface of the bulletproof glass screen 1. This means that the fracture-proof film 3 may be attached to the part of the bulletproof glass screen 1 which bullets may hit. If part of the bulletproof glass screen surface exposed to the outside is covered by the fracture-proof film 3, a bulletproof material as mentioned later like a metal net or metal board may be provided facing the surface of the bulletproof glass screen 1 which is not covered by the fracture-proof film 3.

The above-mentioned fracture-proof film 3 is plastic film: it may be, for example, polyethylene resin, polyester resin, vinyl chloride resin or polycarbonate resin film.

At least one sheet of above-said fracture-proof film 3 is used; however, the number of sheets used may be as desired or varied depending on the structure of the laminated glass 2 of the bulletproof glass screen 1 or the environment or situation in which it is installed. As the environment or situation in which the laminated glass 2 is installed changes, the number of sheets of fracture-proof film 3 may be increased or decreased later. Furthermore, the fracture-proof film 3 may be later attached to the already installed laminated glass 2 with no fracture-proof film 3 in order to make up a bulletproof glass screen 1 according to the present invention. When more than one sheet of fracture-proof film are attached to the laminated glass 2, the fracture-proof film sheets may be of the same type or of different types.

One sheet of fracture-proof film 3 may comprise a single layer of film. Alternatively, it may be a multi-layered film in which a plurality of single film layers of the same plastic material are laminated, or a multi-layered film in which a plurality of single film layers of different plastic materials are laminated. It is desirable that one sheet of fracture-proof film 3 is a multi-layered film for the sake of increased strength and comprises layers of the same plastic material for manufacturing ease. For instance, it is recommended that it be a multi-layered film as a laminate of plural polyethylene plastic film layers.

In manufacturing a sheet of multi-layered fracture-proof film 3, a plurality of single layer plastic films are laminated, pressed and bonded to each other in a way that their drawing or pulling directions, or molecular elongation or fiber directions cross at right angles or at approximately right angles to each other.

It is desirable that the thickness of a sheet of fracture-proof film 3 is not less than 150 μm, more desirably 350 μm or more. The thickness of a sheet of fracture-proof film 3 may be equal to only the thickness of the film itself. Also, if there is an adhesive layer which has been made by coating or spraying an adhesive agent on the surface of the fracture-proof film for bonding to plate glass or another sheet of fracture-proof film (in the case of using plural sheets of fracture-proof film), the thickness of a sheet of fracture-proof film 3 may be equal to the sum of the thickness of the film sheet and that of the adhesive layer.

The fracture-proof film 3 is intended to be attached to plate glass which is component of a laminated glass in order to prevent fracturing of the plate glass, scattering of splinters of glass or the like. On the bonding surface of the fracture-proof film 3, an adhesive layer may be previously made by coating or spraying an adhesive agent such as a water-activated pressure-sensitive adhesive agent for bonding the fracture-proof film 3 to plate glass or another fracture-proof film sheet (in the case of using plural sheets of fracture-proof film), before bonding it to the plate glass.

This makes it possible to join a fracture-proof film sheet to glass plate or two fracture-proof film sheets together as follows: before starting bonding as mentioned above, water is coated, sprayed or otherwise applied to the bonding surface of the fracture-proof film or plate glass; then the bonding surfaces of the film and glass plate or those of one film sheet and another one are made to contact and overlap each other; finally pressure is applied to the adhesive layer to bond them together.

The above-said laminated glass 2 is composed of plural glass plates 4 bonded through a layer or layers of intermediate membrane 5. The number of glass plates 4 which constitute the laminated glass 2 may be 2, 3, 4 or more. However, for the purpose of ensuring lightness or handling ease as a bulletproof glass screen, it is desirable to use two, three or four glass plates (layers) or so; further, three glass plates are more desirable than two and four more desirable than three. The thickness of each of the plural glass plates which constitute the laminated glass 2 is between about 3 mm and about 19 mm. The laminated glass 2 may be composed of plural glass plates of the same type or plural glass plates of different types.

Regarding the structure of the above-said intermediate membrane layer 5, it is possible to use a single intermediate membrane or plural ones, or combine it or them with an adhesive layer or adhesive layers of adhesive agent or the like. When the laminated glass is produced by inserting an intermediate membrane layer between plural glass plates, if the intermediate membrane layer 5 comprises one or more intermediate membranes, they may be bonded together by applying pressure to the intermediate membrane layer through the glass plates (pressure bonding) or heating the intermediate membrane layer through the glass plates (thermal bonding) or by a combination of the pressure and thermal bonding methods. Also, if the intermediate membrane layer 5 is composed of one or more intermediate membranes and an adhesive layer(s), they may be bonded together by using the adhesive layer(s) on the intermediate membrane layer (adhesive bonding), applying pressure to the intermediate membrane layer through the glass plates (pressure bonding) or heating the intermediate membrane layer through the glass plates (thermal bonding) or by a combination of these adhesive, pressure and thermal bonding methods. It is preferable that the intermediate membrane which constitutes an intermediate membrane layer 5 is a plastic film membrane or the like; typically a film membrane made of PVB, polyethylene, EVA or similar plastic material is used. Preferably the thickness of each intermediate membrane layer should be 15 mils (approx. 0.38 mm) or more. When one intermediate membrane layer is to be composed of more than one intermediate membrane, it may be produced by using two, three or more plastic film sheets of the same type, or two, three or more plastic film sheets of different types.

The number of intermediate membrane layers 5 should be subtracted 1 from the number of laminated glass plates; one intermediate membrane layer is sandwiched between two neighboring glass plates as components of a laminated glass.

The each glass plate 4 which constitute the above-said laminated glass 2 may be all equal in thickness. However, with a view to increasing protectiveness, it is desirable that the front glass plate 4, or the glass plate on the impact side (that is, the side not covered by fracture-proof film when only one side of the bulletproof glass screen is covered by such film), is thicker than the rear glass plate 4 behind it.

In a bulletproof glass screen 1 as mentioned above according to the present invention, even if the glass is broken by a bullet, the polyethylene resin fracture-proof film 3 and the intermediate membrane layer 5 are effective in preventing scattering of glass splinters and rather holding them, so the kinetic energy of the bullet is absorbed and the velocity of the bullet goes down. This makes it possible to use the glass which is thinner and lighter than a conventional bulletproof glass.

In each of the above-said bulletproof glass screens 1, its rim is fixed into the groove of a frame 7 through joint sealant such as beads or battens. The bulletproof glass screen 1 may be fixed in its vertical, horizontal or oblique position with joint sealant in the groove of the frame 7. Also, in front of the bulletproof glass screen 1, a see-through metal net 6 may be located away from the screen by a specified distance.

When a bulletproof glass screen device has a structure like this, the energy of a bullet is first absorbed by the metal net 6 and the bullet reaches the above-said bulletproof glass screen 1 according to the present invention.

It is preferable that the glass plates and fracture-proof film used in the present invention are transparent or translucent from the viewpoint of visibility and natural illumination; however, basically they may be of any other type. They may be either colorless or colored. In the above-said laminated glass, the surface on which the fracture-proof film is laid may be flat or curved or bent. It is desirable that the laminated glass has a smooth surface, but the one whose surface is not smooth is also acceptable.

A bulletproof glass screen or bulletproof glass screen device according to the present invention can be used for purposes other than bulletproofing such as protection from relatively small flying objects or collapsing objects.

In a bulletproof glass screen and a bulletproof glass screen device as mentioned above according to the present invention, even if the glass is broken by a bullet, the fracture-proof film and the intermediate membrane layer of the laminated glass are effective in preventing scattering of glass splinters and rather holding them, so the kinetic energy of the bullet is absorbed, resulting in a decrease in the velocity of the bullet and an increase in protectiveness. This makes it possible to use the bulletproof glass which is thinner and lighter than a conventional bulletproof glass; thus it can be produced easily and its workability is high.

DETAILED DESCRIPTION OF THE PREFERRED EMBODIMENTS

FIGS. 1 to 7 are sectional views illustrating the general structures of bulletproof glass screen devices as embodiments 1 to 7 of the present invention.

Figure 1:
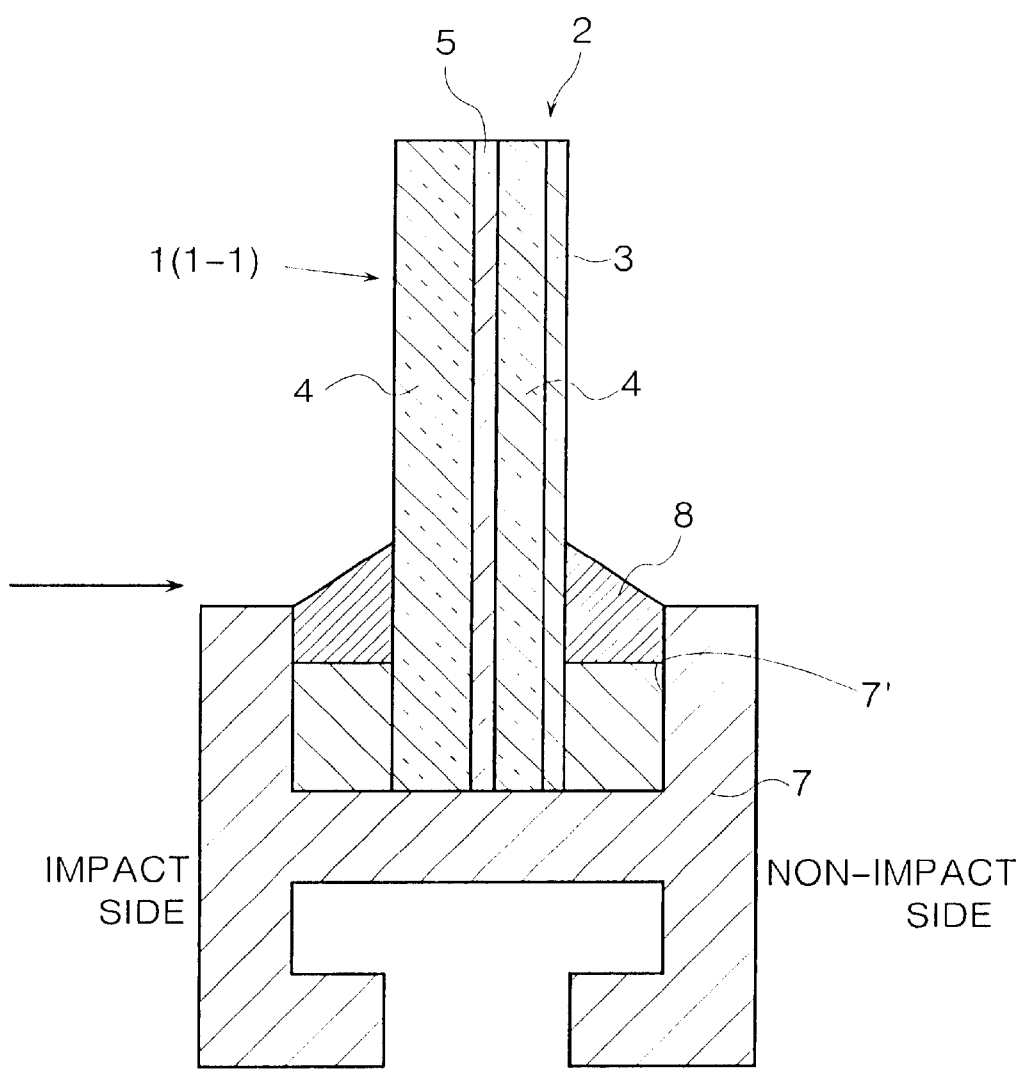
FIG. 1 is a sectional view illustrating the general structure of a bulletproof glass screen device as embodiment 1 of the present invention.

FIG. 1 shows a bulletproof glass screen device according to embodiment 1. The bulletproof glass screen 1 (1-1) employed in this device uses a laminated glass 2 which is made by pressing and bonding two glass plates 4, 4 together through an intermediate membrane layer 5. A sheet of fracture-proof film 3 is attached to the rear face (non-impact side) of the screen. The front face of the laminated glass 2 is the bullet impact side. In this embodiment 1, the thickness of the front glass plate (about 5 mm to about 12 mm) is larger than that of the rear glass plate (about 3 mm to about 8 mm).

The bulletproof glass screen 1 (1-1) is firmly fixed in its vertical position through sealant 8 by having its rim inserted into a groove 7' inside a frame 7. The sealant 8 is made by combining a rubber gasket and a caulking material. The frame 7, which has a virtually groove-like sectional profile, is made of metal by bending or extrusion molding or made of a common material such as wood or plastic. The glass plates 4 may be standard plate glass (float glass). Or it may be of any other type such as linear-material containing glass or ground glass. The thickness of the bulletproof glass screen 1 (1-1) as a laminate composed of two glass plates 4, 4 should be about 15 mm or more, preferably between about 15 mm and about 40 mm.

The frame 7 not only fixes the bulletproof glass screen 1 (1-1) itself in its vertical position but also holds the fracture-proof film 3 in place to prevent it from coming off the laminated glass 2.

Figure 2:
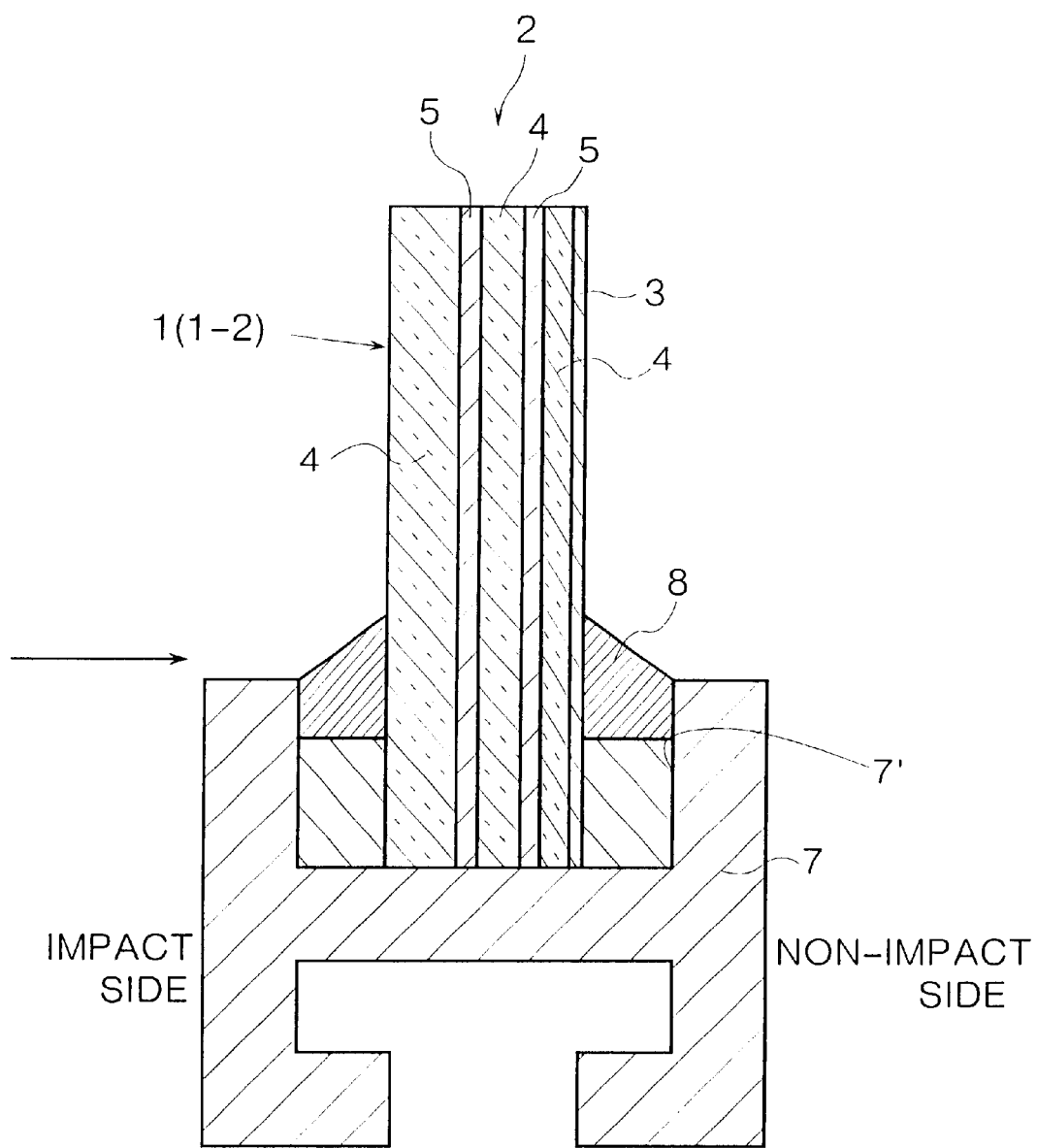
FIG. 2 is a sectional view illustrating the general structure of a bulletproof glass screen device as embodiment 2 of the present invention.

FIG. 2 shows a bulletproof glass screen device according to embodiment 2. The bulletproof glass screen 1 (1-2) employed in this device uses a laminated glass 2 which is made by pressing and bonding three glass plates 4, 4, 4 together through intermediate membrane layers 5, 5. In this embodiment 2, the thickness of the front glass plate (about 5 mm to about 12 mm) is larger than that of the rear glass plates (about 3 mm to about 8 mm). Both the rear glass plates have almost the same thickness. The thickness of the bulletproof glass screen 1 (1-2) as a laminate composed of three glass plates 4, 4, 4 should be about 15 mm or more, preferably between about 15 mm and about 40 mm.

Since the other parts of embodiment 2 are structurally the same as those of embodiment 1 as mentioned above, they are marked with the same reference numerals as those of the corresponding parts of embodiment 1 and their detailed descriptions are omitted here.

Figure 3:
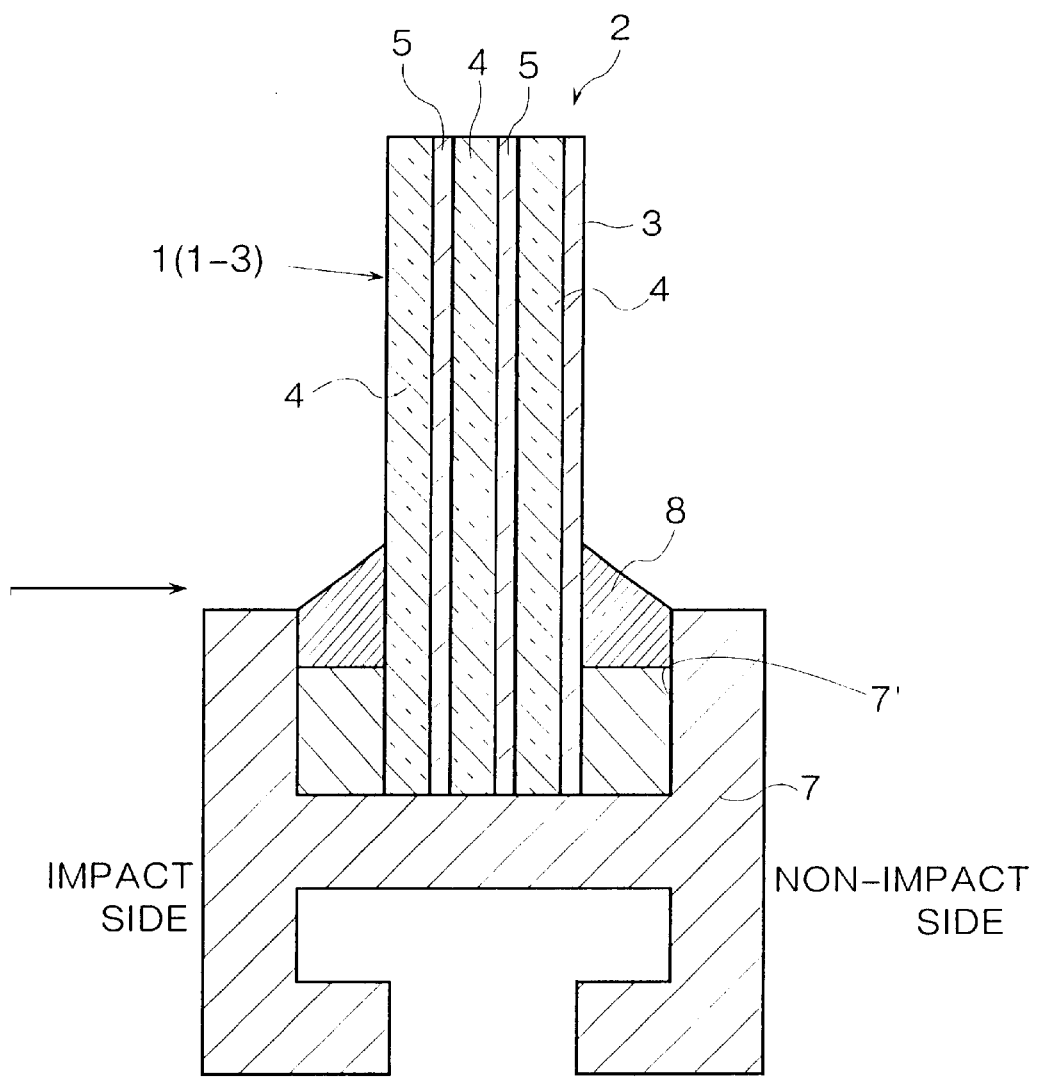
FIG. 3 is a sectional view illustrating the general structure of a bulletproof glass screen device as embodiment 3 of the present invention.

FIG. 3 shows a bulletproof glass screen device according to embodiment 3. The bulletproof glass screen 1 (1-3) employed in this device uses a laminated glass 2 which is made by overlapping and bonding three glass plates 4, 4, 4 together through intermediate membrane layers 5, 5. In this embodiment 3, the three glass plates 4, 4, 4 are almost equal in thickness (about 5 mm to about 12 mm). The thickness of the bulletproof glass screen 1 (1-3) should be about 15 mm or more, preferably between about 15 mm and about 40 mm.

Since the other parts of embodiment 3 are structurally the same as those of embodiment 1 or 2 as mentioned above, they are marked with the same reference numerals as those of the corresponding parts of embodiment 1 or 2 and their detailed descriptions are omitted here.

Figure 4:
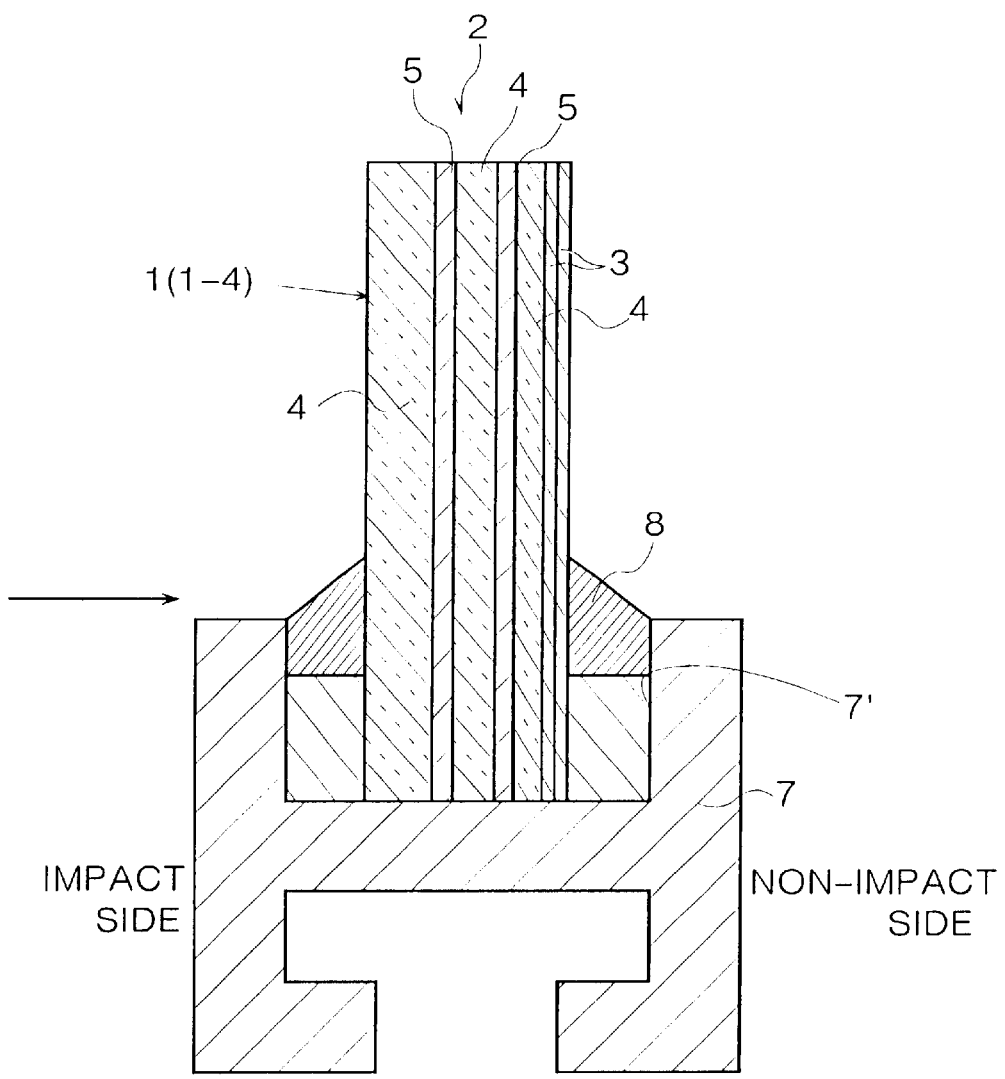
FIG. 4 is a sectional view illustrating the general structure of a bulletproof glass screen device as embodiment 4 of the present invention.

FIG. 4 shows a bulletproof glass screen device according to embodiment 4. The bulletproof glass screen 1 (1-4) employed in this device uses a laminated glass 2 which is made by pressing and bonding three glass plates 4, 4, 4 together through intermediate membrane layers 5, 5. Two sheets of fracture-proof film 3, 3 are attached to the rear face of the bulletproof glass screen 1 (1-4).

Since the other parts of embodiment 4 are structurally the same as those of embodiment 1 or 2 as mentioned above, they are marked with the same reference numerals as those of the corresponding parts of embodiment 1 or 2 and their detailed descriptions are omitted here.

Figure 5:
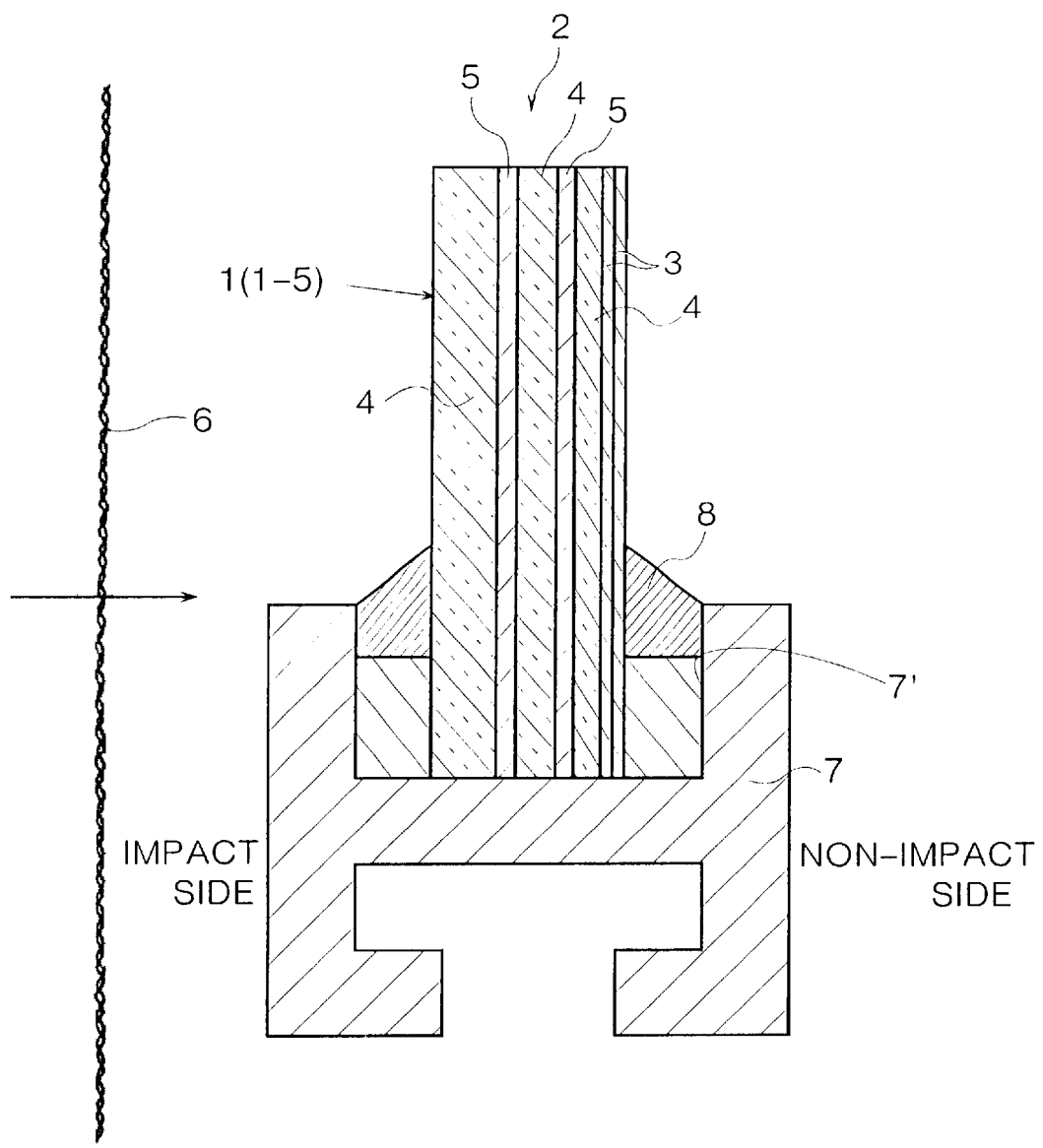
FIG. 5 is a sectional view illustrating the general structure of a bulletproof glass screen device as embodiment 5 of the present invention.

FIG. 5 shows a bulletproof glass screen device according to embodiment 5. In this device, there is a see-through metal net 6 in front of, and some distance away from, the bulletproof glass screen 1 (1-5). The metal net 6 may be made of steel, stainless steel, aluminum, copper, lead or other metal; it may be metal net as used in wire conveyor belts or the like. The wire conveyor belt as used for the above-said metal net has the following structure: spirals in an identical direction are intertwined and rods are passed through intersections of spirals. The way of combining the metal net as given here is merely one example; another way of combining is also usable. It is desirable that the metal net 6 is installed in front of, and 40 mm or more away from, the bulletproof glass screen 1 (1-5).

In the device which combines the above-said metal net and bulletproof glass screen, the energy of a bullet is first absorbed by the metal net and then reaches the bulletproof glass screen. As the bullet hits the metal net, it bends. Preferably the metal net should be installed sufficiently away from the bulletproof glass screen so that it cannot touch the screen when it bends upon being hit by the bullet. By doing so, when protection against bullets from the same power level of gun should be provided, it is possible to decrease the laminated glass overall thickness; on the other hand, when the laminated glass overall thickness should be the same, it is possible to provide protection against bullets from a higher power level of gun.

The bulletproof glass screen to be combined with the above-said metal net may have any of the structures shown in FIGS. 1 to 4 according to embodiments 1 to 4 in which a laminate of two or three glass plates is used; also the laminated glass may be composed of four or more glass plates.

Since the other parts of embodiment 5 are structurally the same as those of embodiment 4 as mentioned above, they are marked with the same reference numerals as those of the corresponding parts of embodiment 4 and their detailed descriptions are omitted here.

Figure 6:
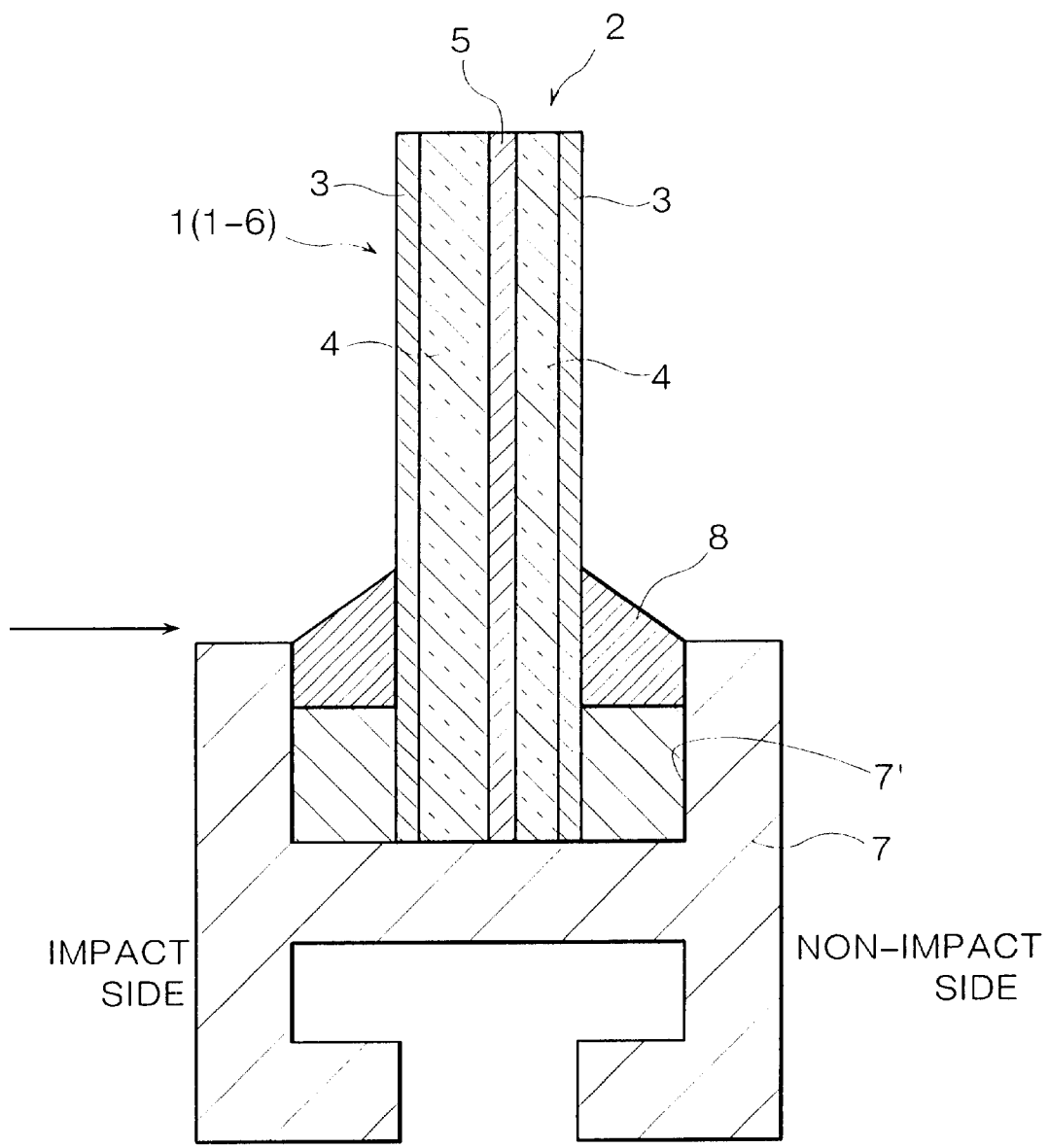
FIG. 6 is a sectional view illustrating the general structure of a bulletproof glass screen device as embodiment 6 of the present invention.

FIG. 6 shows a bulletproof glass screen device according to embodiment 6. The bulletproof glass screen 1 (1-6) employed in this device uses a laminated glass 2 which has fracture-proof films 3, 3 attached to its front and rear faces.

Since the other parts of embodiment 6 are structurally the same as those of embodiment 1 as mentioned above, they are marked with the same reference numerals as those of the corresponding parts of embodiment 1 and their detailed descriptions are omitted here.

Figure 7:
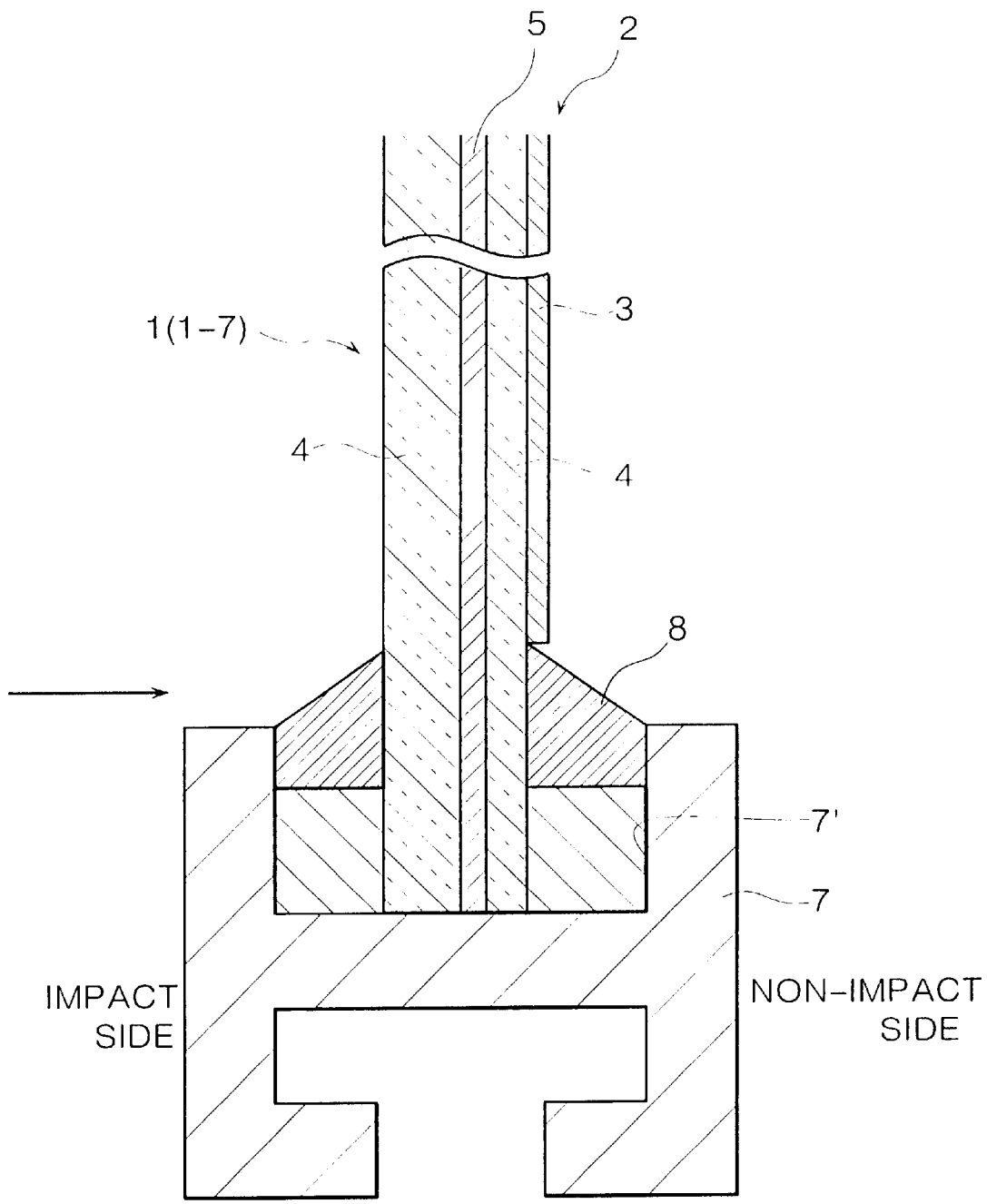
FIG. 7 is a sectional view illustrating the general structure of a bulletproof glass screen device as embodiment 7 of the present invention.

FIG. 7 shows a bulletproof glass screen device according to embodiment 7. In the bulletproof glass screen 1 (1-7) employed in this device, a sheet of fracture-proof film 3 covers the surface except the peripheral area for fixing a laminated glass 2 (virtually all the surface exposed to the outside when the device is installed) while being closely attached thereto.

Since the other parts of embodiment 7 are structurally the same as those of embodiment 1 as mentioned above, they are marked with the same reference numerals as those of the corresponding parts of embodiment 1 and their detailed descriptions are omitted here.

Several tests were conducted on embodiments of the present invention. The tests were carried out in accordance with UL 752 of the U.S.A.

The first test (UL752 Level 1), in which a 9 mm gun was used, was made on a bulletproof glass screen based on a laminated glass comprising three 5 mm-thick float glass plates (refer to FIG. 3 which illustrates embodiment 3). In this bulletproof glass screen, the three float glass plates are overlapped through two intermediate membrane layers with a thickness of 60 mils (approx. 1.52 mm) each of which comprises an intermediate membrane having four sheets of PVB resin film and an adhesive layer of adhesive agent.

The fracture-proof film to be attached to the laminated glass was a sheet of film with a thickness of 360 μm as a laminate composed of three polyethylene resin film layers. This fracture-proof film comprises a laminate of three single polyethylene resin film layers made by overlapping them in a way that their drawing or pulling directions, or molecular elongation or fiber directions are virtually perpendicular to each other. This fracture-proof film is made as a sheet by applying pressure to the above-said three polyethylene resin film layers to bond them together with an acrylic resin adhesive agent.

In addition, this fracture-proof film bears a water-activated pressure-sensitive adhesive on the side which is to be attached to the laminated glass; thus it is bonded to the laminated glass by action of the water-activated pressure-sensitive adhesive agent through application of water and pressure. The fracture-proof film's surface opposite to the surface for bonding to the laminated glass is treated with a hard coating for prevention of scratching.

When three bullets were shot against this bulletproof glass screen, the glass plates were broken but the fracture-proof film was not pierced by the bullets.

The second test (UL752 Level 2), in which a 357 magnum gun was used, was made on a bulletproof glass screen based on a laminated glass comprising two glass plates, one 12 mm-thick float glass plate and one 8 mm-thick float glass plate (refer to FIG. 1 which illustrates embodiment 1). The above-said two float glass plates are laminated through one intermediate membrane layer with a thickness of 60 mils (approx. 1.52 mm) which comprises an intermediate membrane having four overlapped sheets of PVB resin film and an adhesive layer of adhesive agent.

The fracture-proof film to be attached to the laminated glass was a sheet of film as a laminate composed of three polyethylene film layers, as in the first test.

As in the first test above, when three bullets were shot against this bulletproof glass screen, the glass plates were broken but the fracture-proof film was not pierced by the bullets.

The third test was carried out on the bulletproof glass screens (1), (2), (3), and (4) (given below) as specimens in accordance with the test procedure for UL752 Level 2 as mentioned above, where a 357 magnum gun was used. In the descriptions given below, FL represents a float glass, CM an intermediate membrane layer, and PF a fracture-proof film, where the figures in parentheses represent the respective thicknesses. The specimens as described below for this third test use an intermediate membrane layer which comprises an intermediate membrane having two overlapped sheets of PVB resin film and an adhesive layer of adhesive agent. The fracture-proof film used in this test was a sheet of film as a laminate composed of three polyethylene resin film layers, as in the first and second tests.

(1) FL (5 mm)+CM (30 mils)+FL (5 mm)+CM (30 mils)+FL (5 mm)+PF (360 μm) (refer to FIG. 3 which illustrates embodiment 3)

(2) FL (0.375 inch)+CM (30 mils)+FL (0.125 inch)+CM (30 mils)+FL (0.125 inch)+PF (360 μm) (refer to FIG. 2 which illustrates embodiment 2)

(3) FL (0.375 inch)+CM (30 mils)+FL (0.25 inch)+PF (360 μm) (refer to FIG. 1 which illustrates embodiment 1)

(4) FL (0.5 inch)+CM (30 mils)+FL (0.25 inch)+PF (360 μm) (refer to FIG. 1 which illustrates embodiment 1)

When one bullet was shot against the bulletproof glass screen (1), the glass plates were broken but the fracture-proof film was not pierced (a second bullet pierced the film).

When two bullets were shot against each of the bulletproof glass screens (2), (3) and (4), the glass plates were broken but the fracture-proof film was not pierced (a third bullet pierced the film).

The reason for this test result may be considered as follows: even if the glass is broken by a bullet, the fracture-proof film as a laminate composed of multiple layers of polyethylene resin film, and the intermediate membrane layer(s) composed of PVB resin film membrane(s) and adhesive layer(s) are effective in preventing scattering of glass splinters and rather holding them, so the kinetic energy of the bullet is absorbed and the velocity of the bullet goes down. This makes it possible to use the glass which is thinner than a conventional bulletproof glass.

Consequently, if a relatively thin laminated glass is employed, a common glass frame may be used to hold the laminated glass; usually fracture-proof film is attached to the glass during the manufacturing process to save one step from the bulletproof glass screen assembly process. In addition, it is possible to attach the film to an already installed window glass later; by doing so, a relatively high protectiveness is achieved.

As discussed above, a bulletproof glass screen or a bulletproof glass screen device based on the bulletproof glass screen according to the present invention are useful as glass which constitutes a window, wall or ceiling of a structure such as a building or as glass to be installed there.

Also, it is useful as glass which is a component of, or fitted to, a door device, shutter, smoke-control suspended wall device or movable partitioning device such as a sliding wall or low partition to be installed in a structure such as a building, or as glass to be installed in any of these devices.

Moreover, it is useful as glass to be installed at or around a place where coins, bills and valuables are handled, including a cash dispenser and a wicket in a financial institution such as a bank.

Further, it is useful as glass as a component of a device or facility for transportation, storage or display of coins, bills, valuables, precious metals, jewels or firearms, or as glass to be installed in such a device or facility.

Furthermore, it is useful as glass as a component of a telephone box or booth.

Furthermore, it is useful as glass to be installed in such a facility as a convenience store including a simplified form of shop, or a service station.

What is claimed is:

1. A bulletproof glass screen comprising:
    a laminated glass having a front face and a rear face, and
    at least one sheet of plastic fracture-proof film covering one of the front face and the rear face, said fracture-proof film being formed of a laminate of plural layers of resin films made of a material selected from the group consisting of polyethylene resin, polyester resin, vinyl chloride resin, and polycarbonate resin.

2. The bulletproof glass screen as defined in claim 1, wherein said laminated glass is formed of two, three or four layers of plate glass bonded through an intermediate membrane layer or intermediate membrane layers.

3. The bulletproof glass screen as defined in claim 1, wherein said fracture-proof film covers at least a part of the one of the front face and the rear face of the laminated glass.

4. The bulletproof glass screen as defined in claim 1, wherein said fracture-proof film has a thickness not less than 150 μm.

5. The bulletproof glass screen as defined in claim 1, wherein said laminated glass is composed of glass plates, one of said glass plates being located at one of the front face and the rear face where an impact is applied and having a thickness equal to or larger than that of the other of the glass plates.

6. The bulletproof glass screen as defined in claim 1, wherein said one of the front face and the rear face is subject to an impact, the other of the front face and the rear face being covered by said at least one sheet of plastic fracture-proof film.

7. A bulletproof glass screen device having the bulletproof glass screen as defined in claim 1, and a frame having a groove, wherein a rim of the bulletproof glass screen is inserted into the groove of the frame and fixed therein through sealant.

8. A bulletproof glass screen device having the bulletproof glass screen as defined in claim 1, and a see-through metal net provided in front of one of the front face and the rear face of the laminated glass where an impact is a lied.

9. A bulletproof glass screen, comprising:
    a laminated glass having a front face and a rear face, and
    at least one sheet of fracture-proof film covering one of the front face and the rear face, said fracture-proof film being formed of a multi-layered film made of a laminate of plural layers of resin films pressed and bonded together such that drawing or pulling directions, or molecular elongation or fiber directions crossing substantially perpendicular to each other.

10. The bulletproof glass screen as defined in claim 9, wherein said laminated glass is formed of two, three or four layers of plate glass bonded through an intermediate membrane layer or intermediate membrane layers.

11. The bulletproof glass screen as defined in claim 9, wherein said fracture-proof film covers at least a part of the one of the front face and the rear face of the laminated glass.

12. The bulletproof glass screen as defined in claim 9, wherein said fracture-proof film has a thickness not less than 150 μm.

13. The bulletproof glass screen as defined in claim 9, wherein said laminated glass is composed of glass plates, one of said glass plates being located at one of the front face and the rear face where an impact is applied and having a thickness equal to or larger than that of the other of the glass plates.

14. A bulletproof glass screen device having the bulletproof glass screen as defined in claim 9, and a frame having a groove, wherein a rim of the bulletproof glass screen is inserted into the groove of the frame and fixed therein through sealant.

15. A bulletproof glass screen device having the bulletproof glass screen as defined in claim 9, and a see-through metal net provided in front of one of the front face and the rear face of the laminated glass where an impact is applied.

16. The bulletproof glass screen as defined in claim 9, wherein said one of the front face and the rear face is subject to an impact, the other of the front face and the rear face being covered by said at least one sheet of plastic fracture-proof film.

* * * * *